Figure 1:
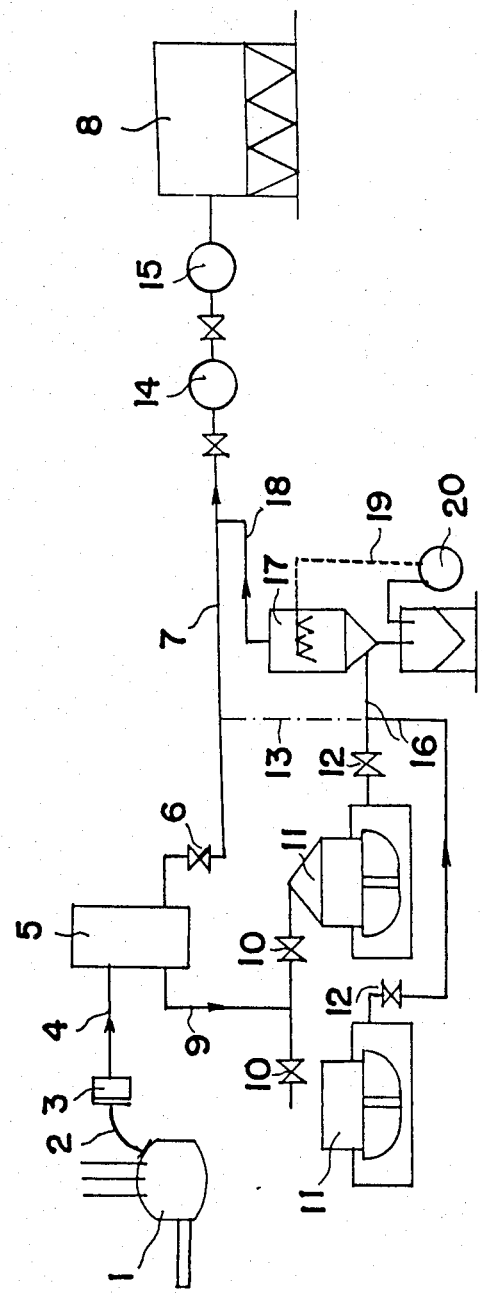
Figure 2:
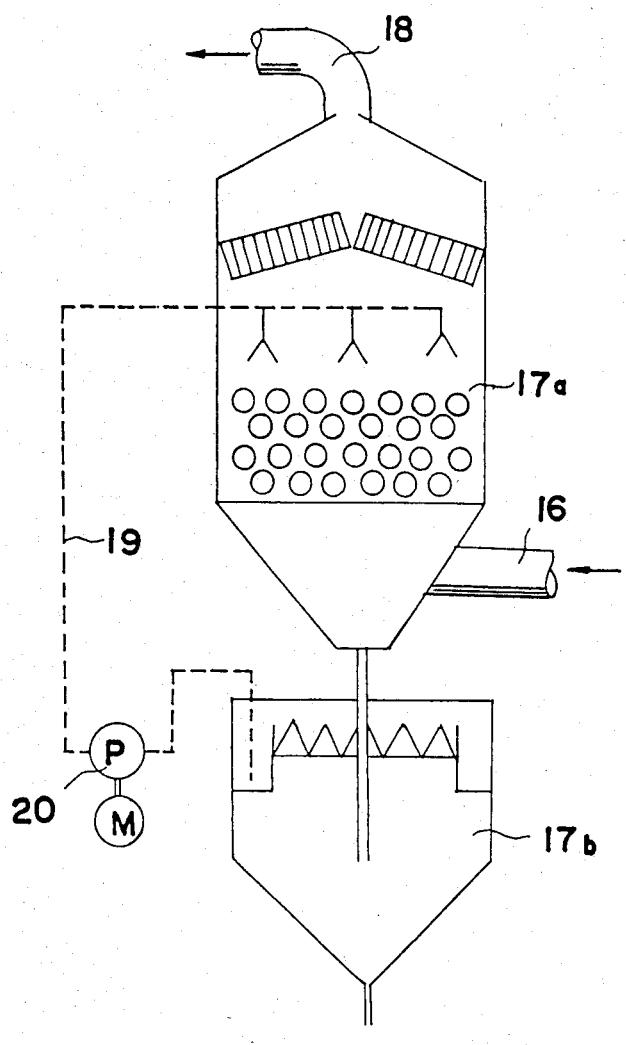

United States Patent [19]

Saitoh

[11] Patent Number: 4,492,567

[45] Date of Patent: Jan. 8, 1985

[54] METHOD OF REMOVAL OF IMPURE GASES AT THE TIME OF SCRAP PREHEATING, AND EQUIPMENT FOR USE OF SAME

[75] Inventor: Kazunori Saitoh, Tokyo, Japan

[73] Assignees: Pennsylvania Engineering Corporation, Pittsburgh, Pa.; Hotaka Engineering Co., Ltd., Tokyo, Japan

[21] Appl. No.: 543,988

[22] Filed: Oct. 20, 1983

[30] Foreign Application Priority Data

Oct. 13, 1982 [JP] Japan ................. 57-178440

[51] Int. Cl.³ .................. F24H 7/00; B01D 47/00
[52] U.S. Cl. ................. 432/30; 55/228; 373/80
[58] Field of Search ............ 432/30, 72; 373/80; 55/90, 228, 233, 257 PV

[56] References Cited

U.S. PATENT DOCUMENTS 4,245,569  1/1981  Fallon .................... 432/72
4,375,958  3/1983  Date et al. ............... 432/72

Primary Examiner—John J. Camby
Attorney, Agent, or Firm—Fred Wiviott

[57] ABSTRACT

A method and apparatus for preheating scrap metal within pure gases discharged from a metallurgical vessel. The method comprises the steps of burning the gases in a combustion chamber to remove impurities therefrom, conducting a first portion of the combustion products to a container of scrap metal, contacting the scrap metal with the combustion products for preheating the scrap metal whereby additional impurities are generated, washing in a wet scrubber the mixture of combustion products and additional impurities, mixing the scrubbed combustion products and additional impurities with a second portion of the combustion products from the combustion chamber, and removing particulates from the mixture.

5 Claims, 2 Drawing Figures

METHOD OF REMOVAL OF IMPURE GASES AT THE TIME OF SCRAP PREHEATING, AND EQUIPMENT FOR USE OF SAME

BRIEF EXPLANATION ON DRAWINGS

FIG. No. 1 shows an example of layout of the performance under this method while FIG. No. 2 shows an enlarged section for same.

DETAILED EXPLANATION ON INVENTION

This invention relates to the method of removal of the impure gases to be emitted at the time of scrap preheating and the equipment for the use of same, and especially, it is made to prevent the occurrence of the secondary pollution to be caused by the half burning of the impurities and oily substances sticking to the surface of the scraps at the time of preheating utilizing the waste gas of the electric furnace in dust collecting equipment. In general, the electric furnaces for steel production are large in size, and as a countermeasure against environmental pollution to be caused by these, the direct evacuation system dust collecting equipment are usually installed for practically all the electric furnaces. However, as in recent when the power cost has shown a sharp rise and energy saving is highly sought, the method of performing preheating of the scraps in advance utilizing the enormous heat volume of the high temperature waste gas from the direct evacuation of the electric furnace has been put into practical use, and is achieving much effect.

If an explanation were to be given on the electric furnace dust collecting equipment where the aforesaid scrap preheating equipment is jointly used from the past example by FIG. No. 1, it will be as follows. The waste gas from the electric furnace 1 will enter the combustion chamber 5 after going through the water-cooled elbow 2, water-cooled sleeve 3 and water-cooled duct 4, and then to the main line for the electric furnace dust collecting equipment which leads to the dust collecting equipment 8 going through the gas volume control damper 6 and water-cooled duct 7. A bypass line for the scrap preheating equipment will be installed. That is, the line runs from the combustion chamber 5 to the scrap preheating equipment 11 going through the preheating inlet change-over damper 10 from where the preheating outlet duct 13 shown in broken line will be connected to the said water-cooled duct 7 going through the preheating gas volume control damper 12, 14 represents a booster fan for pressure increase to be required in case installation of the said scrap preheating equipment while 15 indicates a dust collector fan for drawing in the waste gas to the dust collector 8.

In this case, the adjustment of the gas volume going out from the combustion chamber 5 to the preheating inlet duct 9 namely waste gas preheating bypass line, and to the water-cooled duct 7 namely the main line will be made by adjusting the opening of the preheating gas volume control damper 12 and gas volume control damper 6.

However, in the case of the aforesaid system, as the impurities and oily substances sticking to the surface of the scraps will be half burnt by the waste gas at the time of scrap preheating, the unburnt substances which will become source of purple smoke and bad smell will be much contained, and moreover, as they will be led as they are into the water-cooled duct 7 through the preheating outlet duct 13, the problem of secondary pollution highly undesirable from the standpoint of society can be observed in the waste gas discharged into the atomosphere after going through the dust collector 8.

This invention is meant to solve these problems. Under this invention, the wet scrubber will be installed after the scrap preheating equipment for this purpose with which the bad smell and purple smoke will be removed by allowing the gas to come in contact with the liquid. As for the liquid for for the use of the wet scrubber, depending on the causes of the bad smell, either water or solution made by mixing in hydrogen peroxide will be used. As the waste gas after passing through the wet scrubber runs high in humidity, it will wet the bag filter of the dust collector 8 leading to the increase in the pressure loss and likely to cause damage to the bags but if it were to be combined with that in the line of the dust collecting equipment where the high temperature gas is flowing, its temperature will be raised by this high temperature gas which will enable to operate the dust collecting equipment 8 at above the dew point. The water of the wet scrubber will be recycled for use while the dust in slurry form will be led to the settling tank where after settling, only the cleaned water will by recycled for use.

Next, based on FIG. No. 1 and FIG. No. 2, an explanation on an example of adoption of this invention will be given. Under this invention, the preheating outlet duct 16 to be connected to the preheating gas volume control damper 12 will be connected to the wet scrubber 17 while the wet scrubber outlet duct 18 to be connected to the said wet scrubber 17 will be connected to the said water-cooled duct 7, 19 is solution circulating pipe while 20 represents the pump. In FIG. No. 2 showing the enlarged section, 17a indicates the dust collecting tower while 17b represents the settling tank. In the dust collecting tower 17a, numerous many holed plastic balls are filled in for use as media for the gas and liquid, and by allowing either the cleaning liquid or water to be injected in the direction of counterflow against the gas flow, make to form the liquid membrane on the surface of these balls, and when the dust laden gas passes through the liquid membrane, the dust will be collected. The cleaned liquid on the surface of the settling tank 17b will, by means of the pump 20, be recycled for use, and from its underside, the slurry containing the dust will be discharged.

The operational effects of this invention are given in the following:

(1) By simply adding the wet scrubber to the existing equipment, the purple and bad smell hitherto regarded as environmental pollution can be completely removed.

(2) By allowing the waste gas which has passed through the wet scrubber to be joined to that in the dust collector main line, it will enable the bag type dust collector to operate at above the dew point which in turn will lower the temperature of the ultimate exhaust gas and thereby enable to raise the heat efficiency.

As a process aimed to achieve the same object as in this invention, a method of removal of the bad smell and purple smoke by direct combustion can be taken into consideration but in this case, the temperature will have to be high, and moreover, it will be necessary to draw in oxygen from around the furnace but even with this, it will be impossible to achieve complete removal. Pursuant to the method under this invention, there is a merit of the removal to be more complete when compared to the aforesaid process.

I claim:

1. A method of preheating scrap metal with impure gases containing particulates and discharging from a metallurgical furnace, the method comprising the steps of:
   burning said impure gases in a combustion chamber,
   conducting a first portion of the combustion products from said combustion chamber to a container of scrap metal,
   contacting the scrap metal with said combustion products for preheating the scrap whereby additional impurities are generated and entrained in said combustion products,
   washing in a wet scrubber the combustion products and entrained additional impurities,
   mixing the first portion of the combustion products and entrained additional impurities after wet scrubbing with a second portion of the combustion products from said chamber,
   and removing particulates from the mixture of the second portion of combustion products and the first portion of combustion products and the entrained additional impurities after the wet scrubbing thereof.

2. The method set forth in claim 1 wherein the temperature of the mixture is maintained above the due point thereof.

3. The method set forth in claim 1 wherein there are two containers of scrap metal, the additional steps of conducting the first portion of the combustion products from said combustion chamber to the first scrap metal container and charging scrap into the second container, terminating the delivery of said combustion products to said first container after the scrap therein has been preheated and commencing the delivery of said combustion products to said second container for preheating the scrap therein and discharging the heated scrap from the first container.

4. An apparatus for preheating scrap metal with impure gases containing particulates and discharging from a metallurgical furnace,
   a combustion chamber,
   means for conducting impure gases from the furnace to said combustion chamber,
   a container for scrap metal having an inlet and an outlet,
   means for conducting a first portion of the combustion products from said combustion chamber to the inlet of said container,
   a wet scrubber having an outlet and an inlet connected to the outlet of the container,
   means for bypassing a second portion of the combustion products from said combustion chamber around said container and said wet scrubber and for mixing the same with the scrubbed gases exiting the outlet of the wet scrubber.

5. The apparatus set forth in claim 4 wherein said wet scrubber includes a dust collecting tower and a settling tank, a plurality of apertured plastic balls disposed in said dust collecting tower, means for injecting cleaning water into said tower in a counterflow direction relative to the gas flow whereby a liquid membrane will be formed on the surface of the balls, and means for circulating cleaning fluid from said settling tank to said dust collecting towers so that said dust will form a slurry with the liquid prior to discharge from said gas scrubber.

* * * * *